United States Patent [19]

Hezel

[11] Patent Number: 4,807,328
[45] Date of Patent: Feb. 28, 1989

[54] ROLLER OR CASTER WITH ELECTRICALLY CONDUCTIVE WIPER CONTACT

[75] Inventor: Bruno Hezel, Stuttgart, Fed. Rep. of Germany

[73] Assignee: Gross & Froelich GmbH & Co., Stuttgart, Fed. Rep. of Germany

[21] Appl. No.: 24,626

[22] Filed: Mar. 11, 1987

[30] Foreign Application Priority Data

Mar. 25, 1986 [DE] Fed. Rep. of Germany ....... 8608186

[51] Int. Cl.⁴ .............................................. B60B 33/00
[52] U.S. Cl. ...................................... 16/47; 16/18 R; 361/219
[58] Field of Search ...................... 16/18 R, 37, 38, 47, 16/48; 361/216, 219, 220, 223

[56] References Cited

U.S. PATENT DOCUMENTS

| | | | |
|---|---|---|---|
| 2,280,327 | 4/1942 | Ware | 361/219 |
| 2,728,032 | 12/1955 | Foltz | 361/219 X |
| 2,753,491 | 7/1956 | Legge | 361/219 |
| 4,120,071 | 10/1978 | Crescenzi | 16/47 X |
| 4,290,166 | 9/1981 | Melara | 16/47 |

*Primary Examiner*—Fred A. Silverberg
*Attorney, Agent, or Firm*—Polster, Polster and Lucchesi

[57] ABSTRACT

A roller intended in particular for office furniture comprises a supporting body (1) made from a plastic material, an axle (2) mounted in the supporting body, at least one wheel (2) seated on the axle, a metallic pin (5) seated rotatably in the metallic body and arranged in offset position relative to the axle (2), in a plane extending perpendicularly to the axle, and a wiper contact conductively connected with the pin (5) and provided with a resilient portion projecting beyond the plane (20) extending perpendicularly to the pin (5) and being tangent to the at least one wheel (3). The resilient portion of the wiper contact is formed by a helical spring (12) standing substantially perpendicular to the tangential plane (20) and carrying on its free end a contact body (15) projecting beyond the tangential plane (20).

11 Claims, 1 Drawing Sheet

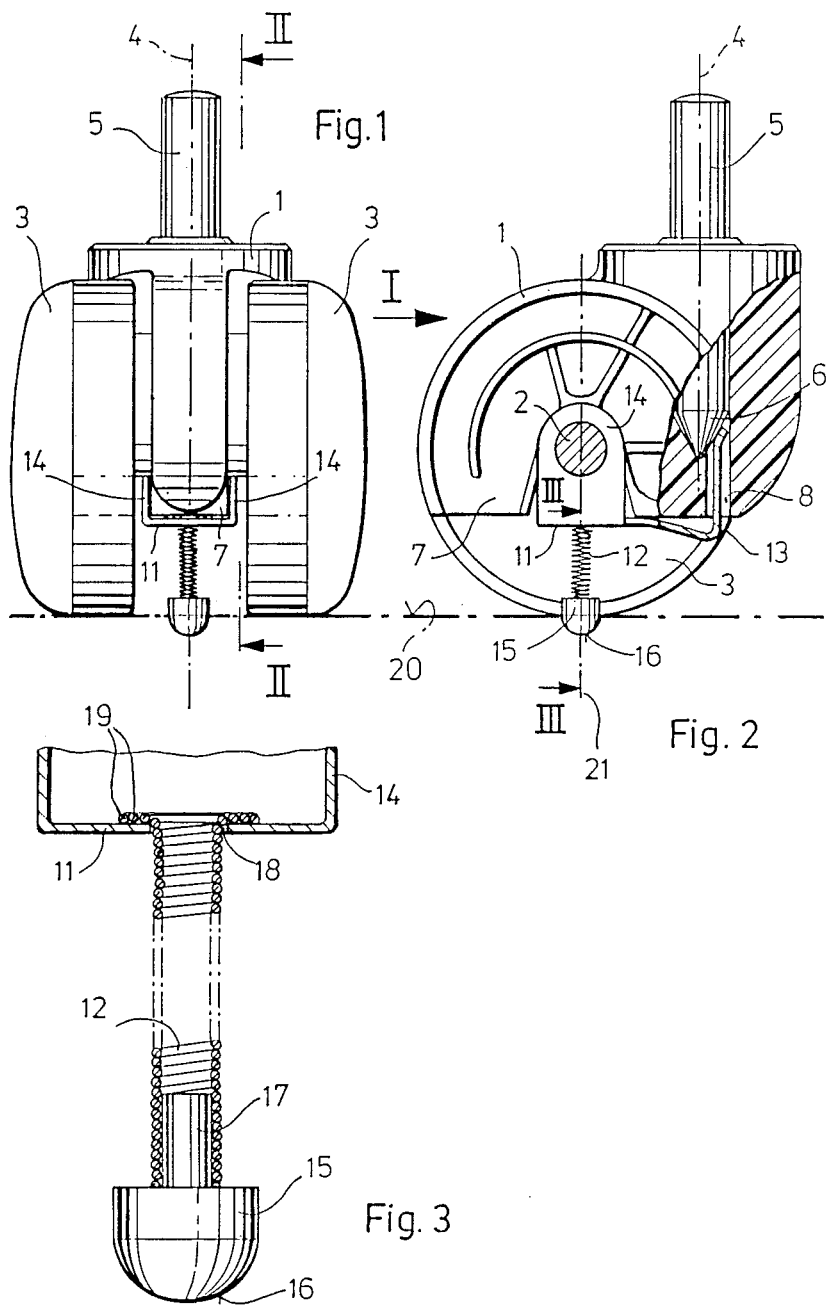

ROLLER OR CASTER WITH ELECTRICALLY CONDUCTIVE WIPER CONTACT

The present invention relates to a roller, in particular for office furniture, comprising a supporting body made from a plastic material, an axle journal mounted in the supporting body, at least one wheel seated on the axle journal, a metallic pin seated rotatably in the metallic body and arranged in offset position relative to the axle journal, in a plane extending perpendicularly to the axle journal, and a wiper contact conductively connected with the pin and provided with a resilient portion projecting beyond the plane extending perpendicularly to the pin and being tangent to the at least one wheel.

A roller of this type has been known already from German Utility Pat. No. 83 15 483. The wiper contact of this known roller is designed in the form of a skid arranged substantially concentrically to the wheel axle and being in contact with the floor by a relatively large surface. The skid is fixed in a bore of the supporting body by means of a pin-like projection, for example by gluing or grouting. Fixing the skid by riveting it to the pin serving to mount the roller on a piece of furniture, in particular on the star-shaped base of a chair, is not possible when the pin is seated rotatably in the supporting body so that the roller can pivot when the piece of furniture is moved.

The drawback of this known roller is seen in the fact that the stirrup used as wiper contact can be distorted very easily being exposed, during pivoting of the roller, to lateral forces which may become very important in particular when such a roller is used on floor carpets with a pronounced loop or knob structure. There is also a risk of such a stirrup getting caught in the carpet. In addition, the carpet is subjected to considerable abrasion which leads to increased wear and gives also rise to annoying bubbles. Moreover, the fixation of the stirrup by means of a pin-like projection which is glued in or grouted is not very safe; the projection may come loose easily so that the skid can be removed from the supporting body and may get lost. On the other hand, if the projection were fixed rigidly in the supporting body, there would be a risk of the contact to the pin getting lost in the course of time due to abrasion, if bearings prevent the pin from changing its axial position in the supporting body towards the end of the wiper contact. However, if the pin is supported merely by a plastic carrying body so that it is permitted to penetrate deeper into the latter in the couse of time, there is a risk of the mounting pin of the wiper contact getting loose due to the pressure exerted on this pin, with the consequence described above.

It has been further known to produce rollers exhibiting a conductivity sufficient to eliminate static charges by using a sufficiently conductive plastic material for the production of the supporting body and of the wheels. To obtain the required conductivity, such plastic materials contain soot as a filler. Consequently, such rollers can be produced only in black color and this is felt to be rather unsuited for modern furniture of light colors. A particular drawback of such rollers is, however, seen in the fact that plastic materials of this type exhibit only limited rigidity, due to the high content of a pulverulent filler, so that rollers made from such plastic materials do not always meet the demands regarding solidity placed upon them.

Now, it is the object of the present invention to improve a roller of the type described above in such a manner that any risk of functional trouble due to distortion or even loss of the wiper contact, or due to insufficient rigidity, is safely avoided, while on the other hand there do not exist any restrictions as regards the color of the plastic material, and any excessive abrasion of the carpets is excluded, too.

According to the present invention, this object is achieved by the fact that the resilient portion of the wiper contact is formed by a helical spring standing substantially perpendicular to the tangential plane and carrying on its free end a contact body projecting beyond the tangential plane.

The use of a helical spring is resilient portion of the wiper contact provides the advantage that no preferential direction exists for the deflection of the wiper contact so that any distortion or permanent deformation that may be caused by deflections of the contact in an undesirable direction, are excluded. In addition, a helical spring can be sized without any problems to adapt it optimally to the operating conditions to be expected, as regards deflecting properties and contact pressure. Further, the contact body provided at the end of the spring can be designed very easily to ensure that on the one hand safe contact is ensured while on the other hand the contact is prevented from getting entangled with the carpet and any additional abrasion is safely excluded.

According to a preferred embodiment of the invention, the helical spring is arranged in such a manner that its axis intersects, at least approximately, the axis of the axle journal carrying the at least one wheel. The helical spring is arranged in this case along that axis about which the roller pivots when being moved relative to the floor. This ensures that the movements which the wiper contact performs relative to the floor when a piece of office furniture provided with such a roller is moved or turned, is reduced to a minimum.

The helical spring may be arranged in a simple manner on the end of a metallic piece of conductor which is fixed to the supporting body and which comprises a portion extending parallel to the tangential plane and a spring arm engaging a recess in the supporting body and having its end in contact with the surface of the pin. The use of a helical spring as resilient portion of the wiper contact enables the spring to be fastened by means of a metallic conductor element which in turn is fixed to the supporting body rigidly and safely, without having to give regard to the design of the helical spring and the contact body. At the same time, it is also possible to provide the supporting body with a spring arm establishing the contact to that pin which serves to mount the roller on the piece of office furniture. Such a spring arm ensures always perfect electric contact between the conductor element and the pin and, thus, between the contact body bearing against the floor and the piece of furniture, via the pin, regardless of any possible degree of wear or any positional changes. To achieve perfect contact between the spring arm and the pin it is of particular advantage in this connection if the surface of the end of the pin located inside the supporting body is at least approximately conical and if the end of the spring arm rests against this conical surface.

Wiper contacts are preferably provided on rollers of the type having two wheels on either side of a central portion of the supporting body. In this case, the helical spring is arranged conveniently between the two wheels. In this case, a particularly simple and safe design of the wiper contact is provided by the invention. The solution proposed by the invention consists of an arrangement in which the conductor element is provided on its edges with tongues which are in contact with lateral surfaces of the central portion of the supporting body and which are provided with bores accommodating the axle journal. It is no longer necessary in this case to fasten the wiper contact at the supporting body of the roller by special processes or additional means. Rather, the wiper contact is held by the axle journal passing through the supporting body and may, therefore, be mounted without any additional operations when the axle journal is inserted into the supporting body. This embodiment of the invention provides the particular advantage that the wiper contact can be fitted subsequently on rollers of a given structure, which means that even existing rollers can be equipped subsequently with such a wiper contact. Besides, it is an advantage also for the current production if in constructing the roller no regard has to be given to the question whether or not a wiper contact is to be fitted. This helps render the production process more flexible.

The contact body provided at the end of the helical spring may simply consist of a button with rounded end face mounted concentrically relative to the helical spring. Such a button is easy to produce and can be fixed easily on the helical spring. The button may be provided, for example, with a pin engaging the inner space of the helical spring. Conversely, it is, however, also possible to provide the contact body with a bore for receiving one end of the helical spring. It is a particular advantage of this arrangement that, irrespective of the material selected for the helical spring and the conductor element, such a contact body may be produced from a material of a given electric resistance. As is generally known, no low-resistance connections to the floor should be established in the case of office furniture, for safety reasons. Quite to the contrary, resistances in the megohm range are regarded as desirable. The wiper contact of the roller according to the invention can be adapted to these requirements without any problems, by proper selection of the material used for the contact body. For example, such a contact may consist in particular of a plastic material filled with conductive substances, without giving rise to the before-mentioned disadvantages connected with the use of such a plastic material, because the small button at the end of the helical spring is practically invisible and does not have to absorb any notable forces, either.

The invention will now be described and explained in detail with reference to the embodiment shown in the drawing. The features shown and described in the specification and the drawing may be used in other embodiments of the invention either individually or in any desired combination thereof. In the drawing FIG. 1 shows a view of a roller according to the invention, in the direction indicated by arrow I in FIG. 2, FIG. 2 shows a section through the roller shown in FIG. 1, taken along line II—II, with the supporting body partly broken off; and FIG. 3 shows a section through the helical spring arrangement of the roller shown in FIG. 2, taken along line III—III, in enlarged scale.

The roller shown in the drawing comprises a supporting body 1 made from a plastic material and an axle journal 2 mounted therein. The ends of the axle journal 2 projecting from the supporting body 1 carry the wheels 3. A metallic pin 5 is mounted rotatably in the supporting body 1, at a distance from the axle journal 2, in a plane 4 extending perpendicularly to the axle journal 2. The surface 6 at the end of the metallic pin 5 located inside the supporting body 1 is of substantially conical shape and rests in a correspondingly shaped bore of the supporting body 1. The roller shown in the drawn has insofar a conventional design.

It is frequently desired to establish an electrically conductive contact between movable office furniture and the floor of the room in which such furniture is located, in order to prevent any static charging of the furniture and, thus, of the present getting into contact therewith. In the case of the roller shown in the drawing, this electrically conductive connection is established by a wiper contact consisting of a metallic conductor element 11 provided on the one hand with a helical spring 12 and on the other hand with a spring arm 13. The conductor element 11, which may for example consist of sheet steel and be produced by punching, rests against the bottom face of the portion of the supporting body 1 provided with the axle journal 2, and carries on its edges two tongues 14 which embrace the central portion 7 of the supporting body 1 and are in contact with the lateral faces of this portion 7. The tongues extend beyond the axle journal 2 and are provided with bores accommodating the axle journal 2. In this manner, the conductor element 11 is connected with the supporting body 1 positively and safely, without any additional measures. The assembly of the conductor element 11 with the helical spring 12 and the spring arm 13 may be effected in connection with the insertion of the axle journal 2, i.e. as late as during the final assembly of the roller. Considering that the conductor element with the helical spring 12 and the spring arm 13 is a component to be fitted additionally, which does not otherwise influence the structure of the roller, it may also be omitted so that it is easily possible, without any changes, to switch over from the production of rollers with wiper contacts to the production of rollers without such wiper contacts, or vice versa.

The before-mentioned spring arm 13 is formed by a bent-off portion of the conductor element 11 which engages a recess 8 in the supporting body and which extends in the same direction as the pin 5, but is set off from the latter relative to its axis. The end of the spring arm 13 rests resiliently against the conical surface 6 of the pin 5. The leaf or tongue-like shape of the conductor element 11 ensures, together with the selection of the material for the metallic conductor element 11, sufficient elasticity of the spring arm 13 to guarantee constant and perfect contact between the conductor element 11 and the pin 5.

The helical spring 12 carries at its end facing away from the axle journal 2 a contact body in the form of a button 15 provided with a rounded end face 16 and, at the side facing the helical spring 12, with a pin 17 engaging the helical spring 12. The elastic stress of the helical spring 12 is sufficient to retain the button 15 and its pin 17 safely in the helical spring 12, without any additional fastening means, and this the more as all forces tending to pull the button out of the helical spring 12 cause the spring to contract and, thus, to exert an even stronger holding force on the button. The other end of the helical spring 12 is fitted simply in a bore 18 of the conductor element 11 and held therein by a number of flattened and enlarged turns 19. The length of the helical spring 12 has been selected in such a manner that the end face 16 of the button 15 projects beyond the plane 20 being tangent to the wheels 3 and extending perpendicularly relative to the axis 4 of the pin 5. In addition, the arrangement of the helical spring 12 is such that its axis 21 intersects the axis of the axle journal 2. This arrangement ensures that when the helical spring is deflected, the button 15 at the end of the helical spring 12 remains always in contact with the floor of a room, which is indicated in the drawing by the plane 20, so as to establish an electrically conductive connection from the floor via the conductor element 11 with its spring arm 13 to the pin 5 by which the roller is mounted on a piece of furniture, for example the base of an office chair. By proper selection of the material to be used for the button 15 it is possible to adjust the conductivity of the connection between the piece of furniture and the floor optimally. The arrangement of the helical spring 12 on an axis 21 intersecting the axle journal 2 provides the advantage that the helical spring 12 is arranged so the axis about which the roller pivots relative to the floor so that the roller has to perform only minimum movements relative to the floor during the pivoting movements of the roller.

Although the embodiment shown in the drawing illustrates a roller with two wheels, it goes without saying that the invention can be applied also to rollers having only one wheel. In addition, it is also understood that there are many other possibilities of mounting the helical spring on the supporting body and of producing a conductive connection with the pin serving to fasten the roller. For example, a solution would be imaginable in which the helical spring is arranged along a line forming the direct extention of the pin, or is even fixed directly on the end of the pin. From the above it results that numerous embodiments differing from the example shown are possible without deviating from the scope of the invention defined by the claims.

I claim:

1. Roller, in particular for office furniture, comprising a supporting body made from a plastic material, an axle mounted in the supporting body, at least one wheel seated on the axle, a metallic pin seated rotatably in the supporting body and arranged in offset position relation to the axle, in a plane extending perpendicularly to the axle, said pin having an at least approximately conical surface adjacent the end of the said pin in said supporting body, and a wiper contact conductively connected to the pin and provided with a resilient portion projecting beyond a plane extending perpendicularly to the pin and tangential to the at least one wheel at a point remote from said pin, wherein the said resilient portion of the said wiper contact is formed by a helical spring having a lower, free end, and an upper end mechanically and electrically connected to a metallic conductor element of said wiper contact which is fixed to said supporting body, said conductor element comprising a portion extending parallel to the said tangential plane and a spring arm engaging a recess in the said supporting body and having an upper end in contact with said approximately conical surface of said pin, said helical spring extending substantially perpendicular to the tangential plane and carrying on said free end a contact body projecting in a direction away from said pin beyond the said tangential plane.

2. Roller according to claim 1 with two wheels seated on said axle and arranged on both sides of a central portion of the supporting body, wherein the said helical spring is arranged between the said two wheels.

3. Roller according to claim 2, wherein the said wiper contact includes an intermediate part provided on its edges with tongues which are in contact with lateral surfaces of the central portion of the said supporting body and which are provided with bores accommodating the said axle.

4. Roller according to claim 1, wherein the said contact body is a button with rounded end face mounted concentrically relative to the said helical spring.

5. Roller according to claim 1, wherein the said contact body is produced from a material having a predetermined electric resistance.

6. Roller according to claim 5, wherein the material having the predetermined electric resistance is a plastic material filled with conductive material.

7. Roller, in particular for office furniture, comprising a supporting body made from a plastic material, said supporting body having a central portion, an axle mounted in said central portion and projecting from opposite sides thereof, two wheels, one on each side of the said central portion, mounted on said axle, a metallic pin seated rotatably in the supporting body and arranged in offset position relative to the axle, in a plane extending perpendicularly to the axle, and a wiper contact including a spring arm conductively connected to the pin and a resilient portion projecting beyond a plane extending perpendicularly to the pin and tangentially to said wheels at a point remote from said pin, said resilient portion of the said wiper contact being formed by a helical spring having one end fixedly mounted in said supporting body and a free end, said helical spring extending substantially perpendicular to the said tangential plane, said helical spring being positioned between the two wheels and carrying on the free end a contact body projecting in a direction away from said pin beyond the said tangential plane, said pin having an at least approximately conical surface adjacent the end in the said supporting body, and an end of said spring arm resting against said conical surface.

8. Roller according to claim 7, wherein the said contact body is a button with a rounded end face mounted concentrically relative to the said helical spring.

9. Roller according to claim 7, wherein the said contact body is produced from a material having a predetermined electrical resistance.

10. Roller according to claim 9, wherein the material having the predetermined electric resistance is a plastic material filled with conductive material.

11. Roller, in particular for office furniture, comprising a supporting body made from a plastic material, said supporting body having a central portion, an axle mounted in said central portion and projecting from opposite sides thereof, two wheels, one on each side of the said central portion, mounted on said axle, a metallic pin seated rotatably in the supporting body and arranged in offset position relative to the axle, in a plane extending perpendicularly to the axle, and a wiper contact conductively connected to the pin, said wiper contact including an intermediate part provided on its edges with tongues which are in contact with lateral surfaces of the central portion of the said supporting body and which are provided with bores accommodating the said axle, said wiper contact also including a resilient portion projecting beyond a plane extending perpendicularly to the pin and tangentially to said wheels at a point remote from said pin, said resilient portion of the said wiper contact being formed by a helical spring having one end fixedly mounted in said intermediate part and a free end, said spring extending substantially perpendicularly to the said tangential plane, said helical spring being positioned between the two wheels and carrying on the free end a contact body projecting in a direction away from said pin beyond the said tangential plane.

* * * * *